United States Patent
Kim

(10) Patent No.: US 10,494,544 B2
(45) Date of Patent: Dec. 3, 2019

(54) COATING COMPOSITION AND WASHER FOR VEHICLE DRIVE SHAFTS MANUFACTURED THEREFROM

(71) Applicants: Hyundai Motor Company, Seoul (KR); Kia Motors Corporation, Seoul (KR)

(72) Inventor: Yool Koo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 84 days.

(21) Appl. No.: 15/834,591

(22) Filed: Dec. 7, 2017

(65) Prior Publication Data
US 2019/0077986 A1    Mar. 14, 2019

(30) Foreign Application Priority Data
Sep. 11, 2017 (KR) .................. 10-2017-0115679

(51) Int. Cl.
| | | |
|---|---|---|
| C09D 179/08 | (2006.01) | |
| C09D 5/08 | (2006.01) | |
| C09D 127/18 | (2006.01) | |
| C09D 179/06 | (2006.01) | |
| C08K 5/54 | (2006.01) | |

(52) U.S. Cl.
CPC ............. C09D 179/06 (2013.01); C09D 5/08 (2013.01); C09D 127/18 (2013.01); *C08K 5/5406* (2013.01)

(58) Field of Classification Search
CPC ...... C09D 179/08; C09D 5/08; C09D 127/18; C08K 5/5419; C08K 13/02; C08L 79/08
USPC .......................................... 428/336
See application file for complete search history.

(56) References Cited

U.S. PATENT DOCUMENTS

2007/0134488 A1 *  6/2007 Hayakawa .............. A47J 36/02
                                                                 428/323

FOREIGN PATENT DOCUMENTS

| JP | 2004-524066 A | 8/2004 |
|---|---|---|
| KR | 10-2010-0103242 A | 9/2010 |

* cited by examiner

*Primary Examiner* — William K Cheung
(74) *Attorney, Agent, or Firm* — Mintz Levin Cohn Ferris Glovsky and Popeo, P.C.; Peter F. Corless

(57) ABSTRACT

Disclosed is a coating composition including an amount of about 5 to 15 wt % of polyamide-imide (PAI), an amount of about 5 to 15 wt % of polytetrafluoroethylene (PTFE), an amount of about 0.5 to 1.5 wt % of fluorosilane, an amount of about 1 to 5 wt % of a ceramic particle, and a solvent component, wherein all the wt % are based on the total weight of the coating composition.

12 Claims, 4 Drawing Sheets

Comparative Example 2      Example

COATING COMPOSITION AND WASHER FOR VEHICLE DRIVE SHAFTS MANUFACTURED THEREFROM

CROSS-REFERENCE TO RELATED APPLICATION

This application claims the priority benefit of Korean Patent Application No. 10-2017-0115679, filed on Sep. 11, 2017 in the Korean Intellectual Property Office, the disclosure of which is incorporated herein by reference.

TECHNICAL FIELD

The present invention relates to a coating composition and a washer for vehicle drive shafts manufactured using the coating composition. The coating composition may provide substantially improved durability and corrosion resistance to a washer.

BACKGROUND OF THE INVENTION

A vehicle has a driving system that transfers power generated by an engine to a wheel. Typically, a hub coupled to the wheel is mounted at an end of the driving system and the hub is coupled to the drive shaft and thus rotates therewith.

For instance, in the end of the driving system is shown in FIG. 1, the drive shaft 10 is inserted into the hub 20 and rotates therewith, and the hub 20 is connected through a hub bearing 30 to a knuckle 50 which is connected to a car body. At this time, a washer 100 is installed in order to prevent direct friction between a Birfield joint 40 directly coupled to the drive shaft 10, and the hub bearing 30. The washer 100 is generally coated with various materials in order to impart low coefficient of friction and high wear resistance to the washer 100.

In the related art, the washer for drive shafts has been made with a stainless steel or SPCC and a coating layer including PTFE has been incorporated. For instance, the coating layer is formed by coating a matrix. with a coating solution consisting of 35% by weight of main ingredients including PAI, PTFE and melamine, and 65% by weight of a solvent used to disperse the main ingredients.

However, since the coating layer formed using the coating solution described above may not be sufficient to provide wear resistance, the matrix of the washer may be exposed. As a result, corrosion may occur or noise by friction between metals may be generated, thus users of the vehicle may experience discomfort.

Accordingly, there is a need for novel coating solutions that have improved wear resistance and corrosion resistance and washers for drive shafts manufactured from the same.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention may provide a coating composition that may improve wear resistance and corrosion resistance, and therefore enhance lifespan and sensibility, and a washer for vehicle drive shafts manufactured using the coating composition.

In one preferred aspect, provided is a coating composition for coating a washer for vehicle drive shafts. The coating composition may include an amount of about 5 to 15 wt % of polyamide-imide (PAD, an amount of about 5 to 15 wt % of polytetrafluoroethylene (PTFE), an amount of about 0.5 to 1.5 wt % of fluorosilane, an amount of about 1 to 5 wt % of a ceramic particle, and a solvent component for constituting the coating composition. All the wt % are based on the total weight of the coating composition.

The "solvent component" as used herein may include one or more distinct solvent, e.g., organic solvents. Preferably, the solvent component may include one or more organic solvents that may be miscible with water.

The fluorosilane may suitably include at least one of perfluorodecyltrimethoxysilane and trifluoropropyltrimethoxysilane.

Preferably, the fluorosilane may suitably have a molecular structure including an organic functional group and an inorganic functional group, the organic functional group may be bonded to the polyamide-imide (PAI) or the polytetrafluoroethylene (PTFE), and the inorganic functional group may be bonded to the ceramic particle or a matrix of the washer. The organic functional group may include Epoxy, Acryloxy, Amino, Mercapto and Fluoro and most preferred organic functional group is Fluoro. The inorganic functional group may include Methoxy and Ethoxy and most preferred inorganic functional group is Methoxy.

Further provided is the coating composition that may consist essentially of, essentially consist of, or consist of the components of the coating composition as described above. For instance, the coating composition may consist essentially of: an amount of about 5 to 15 wt % of the polyamide-imide (PAI); an amount of about 5 to 15 wt % of the polytetrafluoroethylene (PTFE); an amount of about 0.5 to 1.5 wt % of the fluorosilane; an amount of about 1 to 5 wt % of the ceramic particle; and the solvent component. In addition, the coating composition may consist of: an amount of about 5 to 15 wt % of the polyamide-imide (PAI); an amount of about 5 to 15 wt % of the polytetrafluoroethylene (PTFE); an amount of about 0.5 to 1.5 wt % of the fluorosilane; an amount of about 1 to 5 wt % of the ceramic particle; and the solvent component.

Also provided is a washer that may include: a washer body comprising a stainless steel; and a coating layer formed using the coating composition as described herein.

In another aspect of the present invention, provided is a method of manufacturing a washer in a vehicle drive shaft. The method may include: providing a washer body comprising a stainless steel or SPCC, and forming a coating layer on the washer body with a coating composition including an amount of about 5 to 15 wt % of polyamide-imide (PAI), an amount of about 5 to 15 wt % of polytetrafluoroethylene (PTFE), an amount of about 0.5 to 1.5 wt % of fluorosilane, an amount of about 1 to 5 wt % of a ceramic particle, and a solvent component. All the wt % are based on the total weight of the coating composition.

Preferably, the coating layer may suitably have a thickness of about 15 to 25 μm. The coating layer may be produced by curing the coating composition at a temperature of about 200 to 300° C.

The fluorosilane may suitably have a molecular structure including an organic functional group and an inorganic functional group, the coating layer may have a structure in which the organic functional group may be bonded to the polyamide-imide (PAI) or the polytetrafluoroethylene (PTFE), and the inorganic functional group may be bonded to the ceramic particle or the washer body. The organic functional group may include Epoxy, Acryloxy, Amino, Mercapto and Fluoro and most preferred organic functional group is Fluoro. The inorganic functional group may include Methoxy and Ethoxy and most preferred inorganic functional group is Methoxy. Further provided is a vehicle including the washer as described herein.

Other aspects of the invention are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
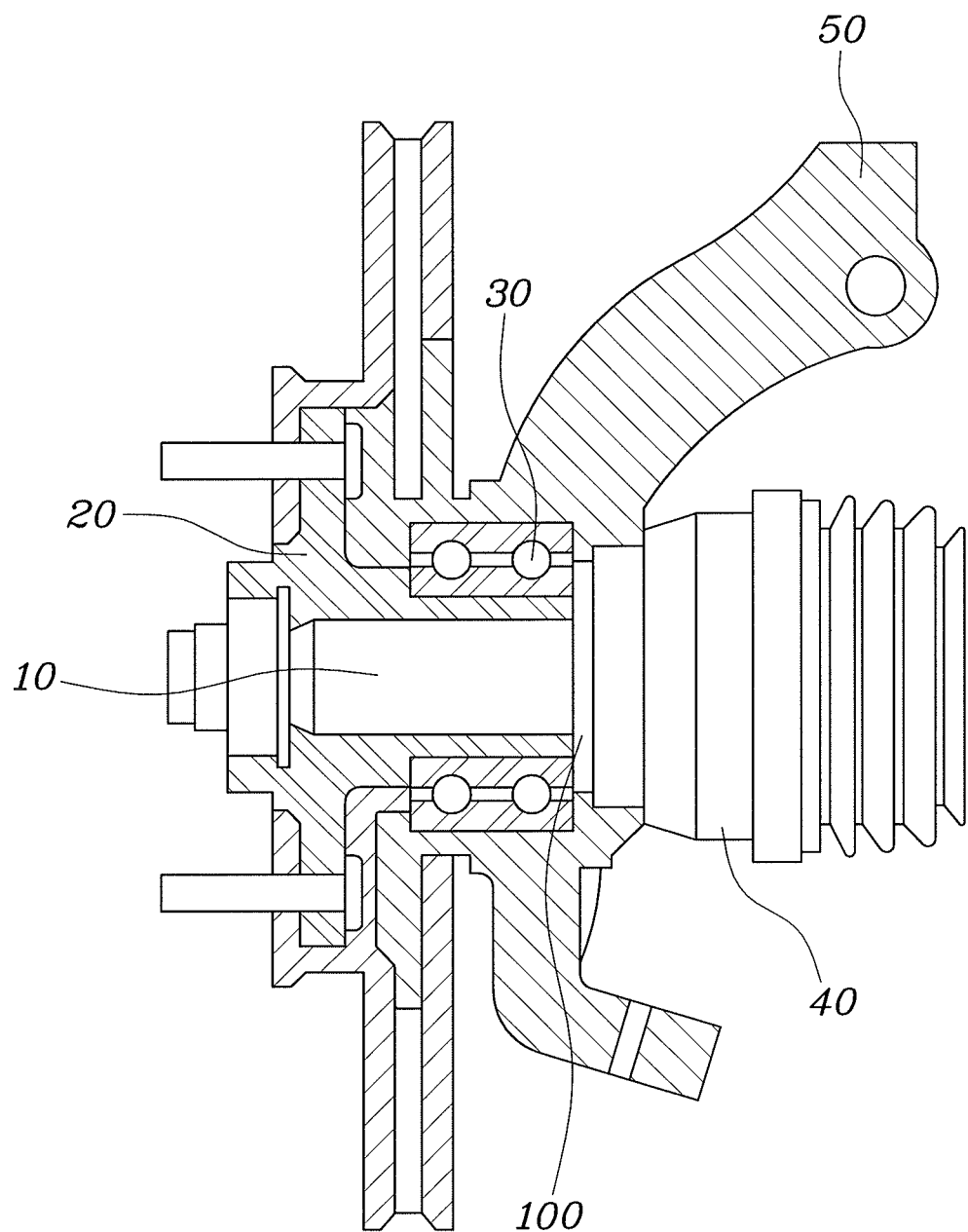
FIG. 1 shows the cross-sectional structure of an end of a vehicle driving system in the related art.

Reference will now be made in detail to the preferred embodiments of the present invention, examples of which are illustrated in the accompanying drawings. However, the present invention is not limited to the embodiments. For reference, throughout the drawings, like reference numerals designate like elements. Under such a rule, contents described in one drawing can be referred to for illustration and contents considered obvious to those skilled in the art or repeated contents can be omitted.

Terminologies used herein are only provided to describe certain embodiments and are not construed as limiting the present invention. The singular forms used herein are intended to encompass plural forms as well, unless the context clearly indicates otherwise. It will be further understood that the terms "comprises" and/or "comprising," when used in this specification, specify the presence of stated features, areas, integers, steps, operations, elements, and/or components, but do not preclude the presence or addition of one or more other features, areas, integers, steps, operations, elements, components, and/or groups thereof.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless otherwise defined, all terms used herein, including technical and scientific terms, have the same meanings as commonly understood by those skilled in the art to which the present invention pertains. Terms defined in generally used dictionaries are also construed to have meanings and concepts corresponding to related art and the content disclosed in the present invention, not meanings that are overly ideal or formal, unless otherwise defined.

Hereinafter, the coating composition and the washer for vehicle drive shafts manufactured from the same according to various exemplary embodiments of the present invention will be described with reference to the annexed drawings.

In one aspect, the coating composition may include an amount of about 5 to 15 wt % of polyamide-imide (PAI), an amount of about 5 to 15 wt % of polytetrafluoroethylene (PTFE), an amount of about 0.5 to 1.5 wt % of fluorosilane, an amount of about 1 to 5 wt % of ceramic particles, and a solvent component. All the wt % are based on the total weight of the coating composition.

The coating composition having the composition defined above may suitably have a density of about 1.04 g/cm$^3$ and a curing temperature of about 200 to 300° C. A coating layer may be formed by applying the coating composition to a matrix and curing the same. Preferably, thus formed coating layer may suitably have a density of about 1.70 g/cm$^3$.

The reasons for adding the respective ingredients of the coating composition and limiting contents thereof within the ranges will be described.

Polyamide-imide (PAI) as used herein may be a binder and may be added to improve wear resistance of the coating layer. When the amount of PAI added is less than about 5 wt %, the wear resistance of the coating layer may be deteriorated and when the amount of PAI is greater than about 15 wt %, the coefficient of friction of the coating layer may be increased, thus deteriorating wear resistance and durability.

Polytetrafluoroethylene (PTFE) as used herein may be added as a lubricant to reduce friction. When the amount of PTFE added is less than about 5 wt %, coefficient of friction may not be sufficiently reduced, and when the amount of PTFE is greater than about 15 wt %, the wear resistance of the coating layer may be deteriorated due to low wear resistance of PTFE.

Fluorosilane may include an organic functional group and an inorganic functional group based on a silicon atom. Preferably, the organic functional group may be bonded to polyamide-imide (PAI) or polytetrafluoroethylene (PTFE) and the inorganic functional group may be bonded to a ceramic particle or a matrix of a washer described later, for example, an iron atom. The organic functional group may include Epoxy, Acryloxy, Amino, Mercapto and Fluoro and most preferred organic functional group is Fluoro. The inorganic functional group may include Methoxy and Ethoxy and most preferred inorganic functional group is Methoxy.

Since the chemical groups in the coating composition and the components of washer or coating layer are strongly bonded and form of a network via the fluorosilane, the total strength and durability of the coating layer as well as adherence of the coating layer to the matrix may be substantially improved. In addition, dense bonding structure may prevent outer moisture from contacting the washer matrix, thereby improving corrosion resistance. When the amount of fluorosilane added is less than about 0.5 wt %, the network bonding structure may not be sufficiently formed, and when the amount of fluorosilane is greater than about 1.5 wt %, the effect may be saturated and no further improvement of performance may be obtained.

The ceramic particle as used herein may reinforce dispersion as being dispersed in the coating layer, to thereby improve strength of the coating layer. The ceramic particle may suitably be selected from various materials including oxide such as $Al_2O_3$ or $Fe_2O_3$, nitride such as $Si_3N_4$ or BN, carbide such as SiC, $MoS_2$, graphite or the like. When the amount of ceramic particle added is less than about 1 wt %, the ceramic particle may not function to improve dispersion, and when the amount of the ceramic particle is greater than about 5 wt %, particles may agglomerate due to aggregation and may not function to improve dispersion, and durability of the coating layer may be deteriorated due to reduction in the number of particles bonded to fluorosilane. The organic solvent as used herein may homogeneously disperse the aforementioned main ingredients such as PAI, PTFE, fluorosilane, or a ceramic particle. Preferred organic solvent may suitably include N-methyl-2-pyrrolidone (NMP). Since the organic solvent evaporates after the coating composition is cured, the final coating layer may include polyamide-imide (PAI), polytetrafluoroethylene (PTFE), fluorosilane and a ceramic particle.

Preferably, the coating composition according to the present invention does not include melamine, which is a component in the conventional coating composition, curing temperature may be decreased, thereby reducing energy required for the process.

Figure 2:
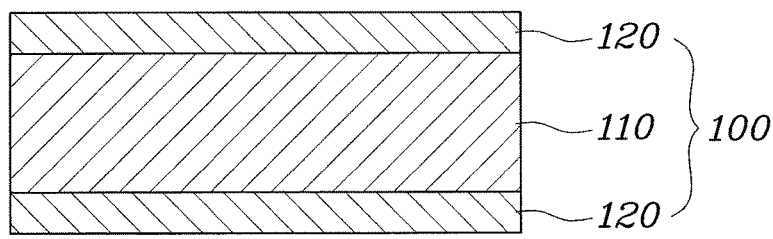
FIG. 2 shows the cross-sectional structure of an exemplary washer according to an exemplary embodiment of the present invention.

FIG. 1 shows the cross-section of an end of a vehicle driving system in the related art and FIG. 2 shows the cross-section of an exemplary washer according to an exemplary embodiment of the present invention.

As shown in FIGS. 1 and 2, the washer 100 may include a washer body 110 and a coating layer 120. The coating layer 120 may be preferably formed on the upper and lower surfaces of the washer body 110, because the upper and lower surfaces of the washer body 110 directly contact the hub bearing 30 or the Birfield joint 40. The present invention is not limited thereto and the coating layer 120 may be formed over the entire surface of the upper and lower surfaces of the washer body 110 as well as both sides thereof.

The material and shape of the washer body 110 are not particularly limited and may be obtained by gas-softening SPCC stainless steel, like a conventional method, or selected from various materials such as stainless steel (SUS), or SKSM stainless steel.

The coating layer 120 may be produced by coating the washer body 110 with the coating composition described above and then curing at a temperature of about 200 to 300° C., and the composition and detailed description of the coating composition have been described above and are thus omitted.

The coating layer 120 may suitably have a thickness of about 15 to 25 μm. When the thickness is less than about 15 μm, sufficient wear resistance and corrosion resistance of the coating layer 120 may not be obtained. In addition, since the thickness of the coating layer 120 obtained by a single coating is limited, several coating operations may be needed in order to form a coating layer having a thickness greater than about 25 μm, thus causing separation between several coating layers formed during coating operations.

Hereinafter, physical properties of the washer for vehicle drive shafts according to the present invention will be described in detail.

Figure 3:
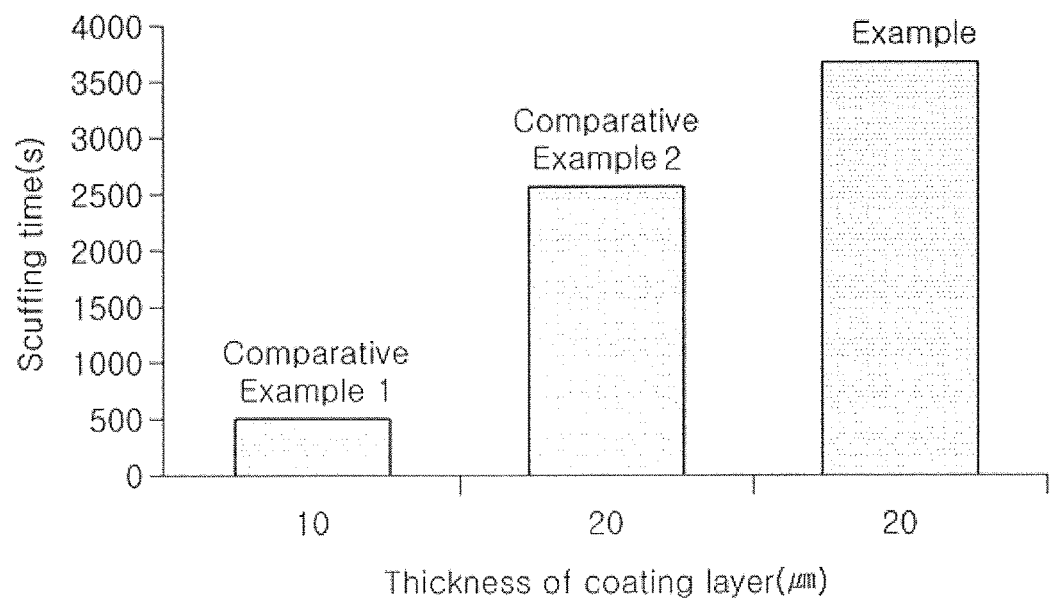
FIG. 3 is a graph showing comparison in scuffing time between an exemplary washer according to Example according to the present invention and a washer according to Comparative Example.
Figure 4:
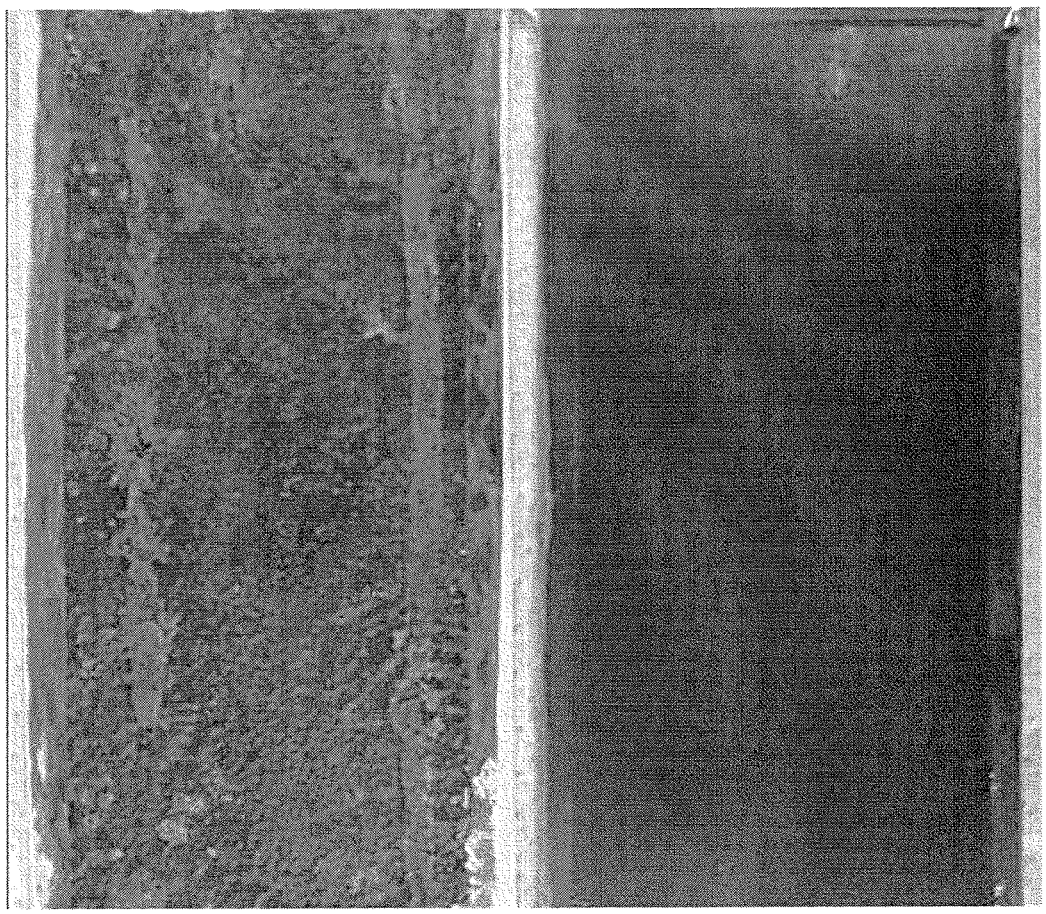
FIG. 4 is an image showing comparison in saline testing results between an exemplary washer according to Example according to the present invention and the washer according to Comparative Example.
Figure 5:
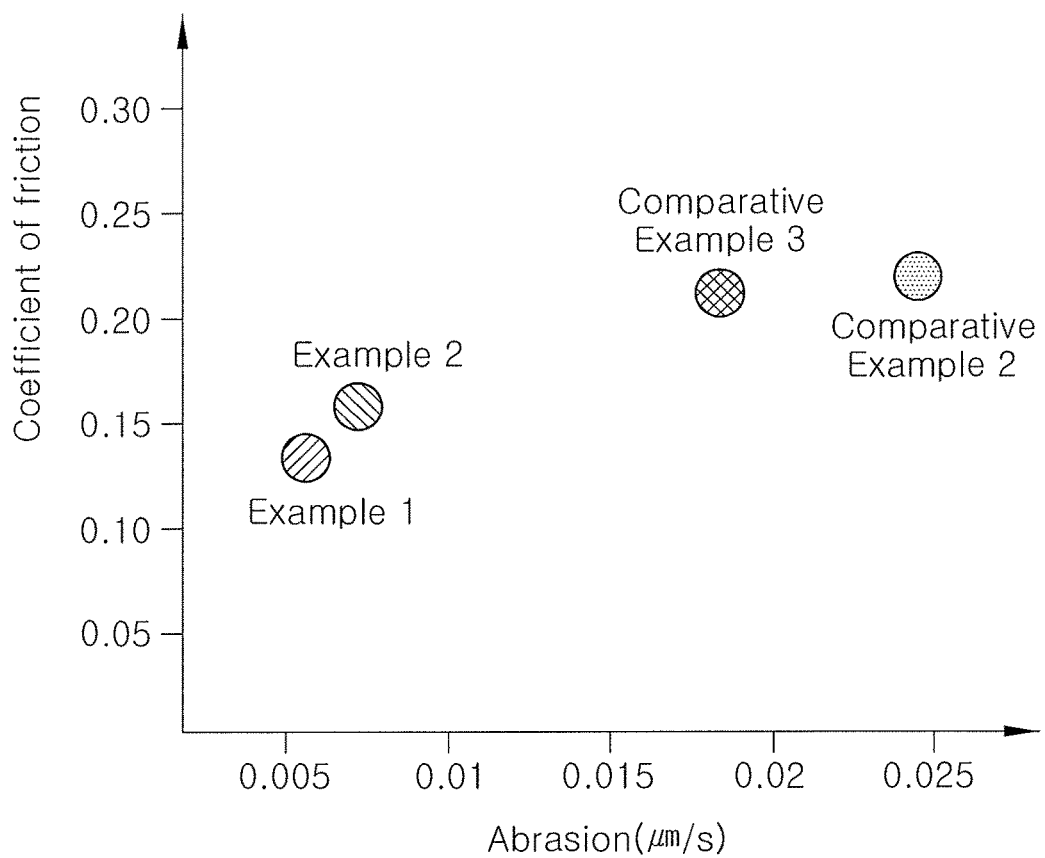
FIG. 5 is a graph showing variation in physical properties of a coating layer, when, among ingredients of an exemplary coating composition according to the present invention, fluorosilane is replaced by another kind of silane.

FIG. 3 is a graph showing comparison in scuffing time between Comparative Example using a conventional coating composition and Example using the coating composition according to the present invention, FIG. 4 is an image showing salt testing results of Comparative Example and Example, and FIG. 5 is a graph showing variation in physical properties of the coating layer, when, among ingredients of the coating composition according to the present invention, fluorosilane is replaced by another kind of silane.

EXAMPLE

Hereinafter, exemplary coating composition and washer for vehicle drive shafts manufactured from the same according the present invention will be described in detail.

1. Example

The coating solution consisting of 10 wt % of polyamide-imide (PAI), 10 wt % of polytetrafluoroethylene (PTFE), 1 wt % of fluorosilane, 5 wt % of a ceramic particle, and the balance of an organic solvent was applied to a matrix made of SPCC-SD and cured at a temperature of 200° C. for 2 hours to produce a coating layer. Example 1 included perfluorodecyltrimethoxysilane was used as the fluorosilane and Example 2 included trifluoropropyltrimethoxysilane as the fluorosilane. At this time, the thickness of the coating layer was 20 μm.

2. Comparative Example

The coating solution including 35% of the total weight of the main ingredient including polyamide-imide (PAI), polytetrafluoroethylene (PTFE) and melamine, and the balance of an organic solvent was applied to a matrix made of SPCC-SD and then cured at a temperature of 320° C. for 2 hours to produce a coating layer.

At this time, the thickness of the coating layer of Comparative Example 1 was 10 μm and the thickness of the coating layer of Comparative Example 2 was 20 μm.

3. Testing (1) Scuffing Testing (Rotational Friction Test)

Comparative Example 1, Comparative Example 2 and Example were tested under dry friction conditions using SUJ2 bearing steel as a counter material at a load of 800N and at a rotation rate of 500 rpm. The testing stopped when scuffing occurred.

(2) Torsion Durability Test

Washers provided with coating layers each formed in Comparative Example 2 and Example, as well as drive shafts, hubs, hub bearings and Birfield joints practically applied to vehicles were coupled, and coating abrasion and noise formation were then observed while repeatedly rotating by a predetermined angle in a horizontal direction.

(3) Salt Test

A 5% NaCl solution was sprayed onto the stainless steel materials provided with coating layers applied to Comparative Example 2 and Example at a temperature of 35° C. at a spray pressure of 1.0 kgf/cm² for 400 hours. Results were obtained.

4. Results (1) As shown in FIG. 3, Comparative Examples 1 and 2 using a conventional coating solution during scuffing test exhibited bad scuffing times compared to Example. That is, it can be seen that the coating layer produced from the coating solution according to the present invention exhibited excellent durability compared to the conventional coating layer.

(2) As a result of torsion durability test, in Comparative Example 2, noise was measured after 118 cycles of the torsion durability test, and at the time of 20,000 cycles, the coating was worn out, the matrix was exposed and rust was created.

On the other hand, in Example, even at 16,000 cycles of torsion durability test, the matrix was not exposed, noise was not measured, and durability was thus more than 8 times that of the conventional coating layer.

(3) As shown in FIG. 4, in Comparative Example 2, the surface was deformed and rust liquid flowed due to corrosion of the matrix, whereas in Example, surface deformation or rust of the matrix was not observed.

On the other hand, FIG. 5 shows coefficient of friction and abrasion degree during friction test. As shown in FIG. 5, Example according to the present invention exhibited low coefficient of friction and high wear resistance, compared to Comparative Examples.

The Example 1 shown in FIG. 5 shows a case in which perfluorodecyltrimethoxysilane was used as the fluorosilane regarding the composition of Example used in FIGS. 3 and 4, and Example 2 shows a case in which trifluoropropyltrimethoxysilane was as used as the fluorosilane.

Comparative Example 2 included the same fluorosilane as in Comparative Example 2 used in FIGS. 3 and 4, and Comparative Example 3 included aminopropyltrimethoxysilane, i.e., amino-based silane, instead of fluorosilane of Examples used in FIGS. 3 and 4. Indeed, Examples 1 and 2 using fluorosilane for the coating solution exhibited low coefficient of friction and high wear resistance, compared to Comparative Example 2 produced by a conventional method or Comparative Example 3 using amino-based silane.

According to various exemplary embodiments of the present invention, the coating layer having substantially improved wear resistance and corrosion resistance as well as substantially reduced friction coefficient may be formed by using the exemplary coating compositions. As a result, lifespan expectancy of the washer for vehicle drive shafts may be remarkably increased, noise formation may be suppressed and sensitivity may thus be improved.

Therefore, a washer that may be interposed between a hub bearing and a Birfield joint may have a longer life time due to improved wear resistance and corrosion resistance of the coating layer. In addition, creation of noise by friction between metals may be prevented due to high wear resistance of the coating layer. The coating solution may also easy used for conventional process for manufacturing washers.

Although the exemplary embodiments of the present invention have been disclosed with reference to the annexed drawings, those skilled in the art will appreciate that the present invention can be implemented in different embodiments without departing from the technical concepts and essential features of the invention.

Therefore, the aforementioned embodiments are provided only for illustration and are not to be construed as limiting the scope of the invention. It should be interpreted that the scope of the present invention is defined not by the Detailed Description of the Invention, but the claims described later, and includes the meanings and scopes of the claims as well as all alterations or substitutions that can be inferred from equivalents thereto.

What is claimed is:

1. A coating composition for coating a washer for vehicle drive shafts comprising:
    an amount of about 5 to 15 wt % of polyamide-imide (PAI);
    an amount of about 5 to 15 wt % of polytetrafluoroethylene (PTFE);
    an amount of about 0.5 to 1.5 wt % of fluorosilane;
    an amount of about 1 to 5 wt % of a ceramic particle; and
    a solvent component,
    all the wt % based on the total weight of the coating composition.

2. The coating composition of claim 1, wherein the fluorosilane comprises at least one of perfluorodecyltrimethoxysilane and trifluoropropyltrimethoxysilane.

3. The coating composition of claim 1, wherein the fluorosilane has a molecular structure comprising an organic functional group and an inorganic functional group,
    the organic functional group is bonded to the polyamide-imide (PAI) or the polytetrafluoroethylene (PTFE), and
    the inorganic functional group is bonded to the ceramic particle or a matrix of the washer.

4. A coating composition for coating a washer for vehicle drive shafts consisting essentially of:
    an amount of about 5 to 15 wt % of the polyamide-imide (PAI);
    an amount of about 5 to 15 wt % of the polytetrafluoroethylene (PTFE);
    an amount of about 0.5 to 1.5 wt % of the fluorosilane;
    an amount of about 1 to 5 wt % of the ceramic particle; and
    the solvent component,
    all the wt % based on the total weight of the coating composition.

5. A coating composition for coating a washer for vehicle drive shafts consisting of:
    an amount of about 5 to 15 wt % of the polyamide-imide (PAI);
    an amount of about 5 to 15 wt % of the polytetrafluoroethylene (PTFE);
    an amount of about 0.5 to 1.5 wt % of the fluorosilane;
    an amount of about 1 to 5 wt % of the ceramic particle; and
    the solvent component,
    all the wt % based on the total weight of the coating composition.

6. A washer comprising:
    a washer body comprising a stainless steel; and a coating layer formed by using a coating composition,
    wherein the coating composition comprises an amount of about 5 to 15 wt % of polyamide-imide (PAI), an amount of about 5 to 15 wt % of polytetrafluoroethylene (PTFE), an amount of about 0.5 to 1.5 wt % of fluorosilane, an amount of about 1 to 5 wt % of a ceramic particle and a solvent component, all the wt % based on the total weight of the coating composition.

7. The washer of claim 6, wherein the coating layer has a thickness of about 15 to 25 μm.

8. A method of manufacturing a washer for a vehicle drive shaft comprising:
    providing a washer body comprising a stainless steel; and
    forming a coating layer on the washer body with a coating composition comprising an amount of about 5 to 15 wt % of polyamide-imide (PAI), an amount of about 5 to 15 wt % of polytetrafluoroethylene (PTFE), an amount of about 0.5 to 1.5 wt % of fluorosilane, an amount of about 1 to 5 wt % of a ceramic particle, and a solvent component, wherein the all wt % based on the total weight of the coating composition.

9. The method of claim 8, wherein the coating layer has a thickness of about 15 to 25 μm.

10. The method of claim 8, wherein the coating layer is formed by curing the coating composition at a temperature of about 200 to 300° C.

11. The method of claim 8, wherein the fluorosilane has a molecular structure including an organic functional group and an inorganic functional group, and the coating layer has a structure in which the organic functional group is bonded to the polyamide-imide (PAI) or the polytetrafluoroethylene (PTFE), and the inorganic functional group is bonded to the ceramic particle or the washer body.

12. A vehicle comprising a washer of claim 6.

* * * * *